United States Patent [19]

Mayer et al.

[11] 4,307,751

[45] Dec. 29, 1981

[54] PLATE VALVE

[75] Inventors: Thomas E. Mayer, Tonawanda; John N. Story, West Seneca, both of N.Y.

[73] Assignee: Edison International, Inc., Rolling Meadows, Ill.

[21] Appl. No.: 98,605

[22] Filed: Nov. 29, 1979

[51] Int. Cl.³ ............................................. F16K 15/08
[52] U.S. Cl. ............................ 137/512.1; 137/516.13; 137/516.19; 137/454.4
[58] Field of Search .................. 137/516.11, 516.13, 137/516.15, 516.17, 516.19, 516.21, 516.23, 512.1, 454.4

[56] References Cited

U.S. PATENT DOCUMENTS

| | | | |
|---|---|---|---|
| 3,358,710 | 12/1967 | Page | 137/516.21 X |
| 3,391,704 | 7/1968 | Kremer, Jr. | 137/512.1 |
| 3,536,094 | 10/1970 | Manley, Jr. | 137/516.11 X |
| 3,656,500 | 4/1972 | Mayer et al. | 137/516.17 X |
| 4,184,508 | 1/1980 | Mayer et al. | 137/512.1 |

*Primary Examiner*—William R. Cline
*Attorney, Agent, or Firm*—Jon Carl Gealow; Ronald J. LaPorte; William H. Wendell

[57] ABSTRACT

A valve having a plurality of movable, coaxially arranged annular plates is characterized by the use of fiber reinforced plate members having a thickness of greater than 0.2 inches and, in a preferred embodiment, a thickness to width ratio in excess of 0.5. A valve in accordance with the present invention is also characterized by the ratio of the number of biasing springs associated with each plate to the mean diameter of the plate being greater than 1.2 per inch.

10 Claims, 4 Drawing Figures

PLATE VALVE

BACKGROUND OF THE INVENTION (1) Field of the Invention

The present invention relates to improving the performance and reliability of valves of the type which employ a plurality of movable, coaxially arranged annular plates. More specifically, this invention is directed to plate valves of the type particularly well suited for use as one-way flow control devices at the intakes to and discharges from reciprocating compressors. Accordingly, the general objects of the present invention are to provide novel and improved methods and apparatus of such character.

(2) Description of the Prior Art

Check or one-way flow control valves employing annular plates as the moving elements or valve members are well known in the art. A plate valve characterized by significantly enhanced efficiency, when compared to prior art devices of similar character, is disclosed in co-pending application Ser. No. 837,408 which is assigned to the assignee of the present invention. Another example of a prior art plate valve of the type to which the present invention is directed may be found in U.S. Pat. No. 3,656,500. Plate valves are employed in both the inlets to and discharge lines from reciprocating compressors. In a typical reciprocating type compressor installation, there may be from two to twenty valves per cylinder and thus a single compressor may have in excess of one hundred valves associated therewith. A failure of any one valve will disable the entire compressor. Accordingly, reliability is a prime consideration in the design of a plate valve.

The typical prior art plate valve has a seat member and a guard member which cooperate to define the valve housing. The seat member is provided with a plurality of arcuately shaped passages therethrough and these passages are arranged in concentric circles to thereby effectively define a plurality of annular passages which communicate with the valve chamber or chambers. The guard member, which is shaped to form the valve chamber, is also provided with passages which effectively define a plurality of concentric ports or passages. The passages in the guard member are radially staggered with respect to the passages in the seat member. The guard member is also provided with recesses which receive biasing springs. The annular plates or valve members are located in the valve chamber intermediate the seat and guard members and have a flat surface with a width exceeding the width of the inwardly disposed ends of the passages in the seat member. Posts, typically extending from the guard member, constrain the annular plates to movement only toward and away from the inwardly disposed ends of the passages in the seat member which they cover in the closed position. The annular valve plates are resiliently biased, by means of the aforementioned springs located in the recesses in the guard member, against the seat whereby the valve will normally be closed. When the forces on the plates resulting from the applied pressure exceed the spring bias, the plates will move away from the seat and fluid will flow through the valve. In view of the radial offset of the passages in the seat member with respect to those in the guard member, fluid flowing through the valve will undergo a change in direction. The valve of co-pending application Ser. No. 837,408 constitutes a significant step forward in the art by virtue of enhancing valve efficiency be minimizing pressure losses. Those unique characteristics of the valve of application Ser. No. 837,408 which contribute to the minimizing of pressure losses are employed in the valve of the present invention and thus the disclosure of application Ser. No. 837,408 is hereby incorporated herein by reference.

For the reasons briefly discussed above, there is a long standing desire in the art to further enhance the reliability of a plate valve, including the valve of aforementioned application Ser. No. 837,408, without sacrificing overall system efficiency by increasing the pressure losses which may be attributed to the valve. Further, it has also been desired to reduce manufacturing costs, and particularly expensive machine steps, without adversely affecting either pressure drop or valve reliability.

SUMMARY OF THE INVENTION

The present invention comprises a plate valve characterized by enhanced reliability and reduced manufacturing cost when compared to the prior art. The advantages of increased reliability and reduced cost are achieved without adversely affecting the operating characteristics of the valve and particularly without increasing the pressure drop between the inlet and discharge ports of the valve.

A valve in accordance with the present invention employs plates having a thickness of greater than 0.2 inches and, in accordance with one embodiment, the thickness to width ratio of the plates is greater than 0.5. The increased plate thickness reduces the possibility of fatigue, particularly in the areas where the biasing force is applied to the plates, and thus enhances reliability. Also in accordance with a preferred embodiment, the plates are comprised of a fiber reinforced plastic, glass-filled nylon for example, which exhibit only a slight change in width as a result of variations in operating temperature. This stability in plate width is, in part, attributable to the plate width and it is to be noted that the glass-filled nylon plates are capable of radial growth and shrinkage while their width remains virtually the same.

A further characteristic of a plate valve in accordance with a preferred embodiment of the present invention is that the ratio of the number of biasing springs which act on each plate to the mean diameter of the plate is greater than 1.2; i.e., the number of biasing springs is at least 1.2 per inch of plate diameter. This constitutes an increase in the number of springs when compared to the prior art and minimizes plate stress while improving the ability of the springs to prevent plate cocking.

A further feature of a valve in accordance with a preferred embodiment of the present invention resides in the forming of the seat and guard members such that an axially located bolt which holds these members together may be inserted from either side of the valve. This arrangement allows installation of the valve in a cylinder head of a reciprocating compressor with the head of the axial valve assembly bolt always disposed away from the cylinder bore thereby insuring that the piston will not hit the bolt. Additionally, this arrangement allows interchanging of the seat and guard members so that the same valve may be used as either a suction or discharge control device.

A further characteristic of valves in accordance with a preferred embodiment of the present invention resides facilitating the centering of the seat and guard through the use of an annular recess on both members at the facing ends of the bore which receives the valve assembly bolt. A short split tube will be received in these recesses and will provide easy and accurate locating of the guide posts on the guard while maintaining easily achievable machining tolerances.

Other novel features of a valve in accordance with a preferred embodiment of the present invention will be discussed below in the description of a preferred embodiment.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 3 is a side elevation view of a biasing element of the valve of FIGS. 1 and 2; and FIG. 4 is an end view of the element of FIG. 3.

DESCRIPTION OF THE PREFERRED EMBODIMENT

A plate valve in accordance with the disclosed embodiment of the present invention includes a seat member 10, a guard member 12 and a plurality of annular plates or sealing rings such as indicated at 14, 14' and 14''. Plate 14, 14' and 14'' will collectively be referred to as "14" unless distinctions are being made. The seat and guard will typically be comprised of iron and will be formed by casting. In the prior art a comparatively time-consuming and expensive machining step has been required to precisely size the inwardly disposed ends of the passages in seat member 10 and to form the flat seating surface which cooperates with the movable plates 14. Pursuant to the disclosed embodiment of the present invention, a seat insert 16 is employed in the interest of eliminating this expensive machining step. Insert 16 will comprise a metal stamping captured between seat member 10 and guard member 12; it being possible to form the arcuately shaped ports with which the plates 14 cooperate with the requisite precision by stamping. Accordingly, when insert 16 is employed, the seat member 10 may be merely cast and subsequently faced.

Figure 1:
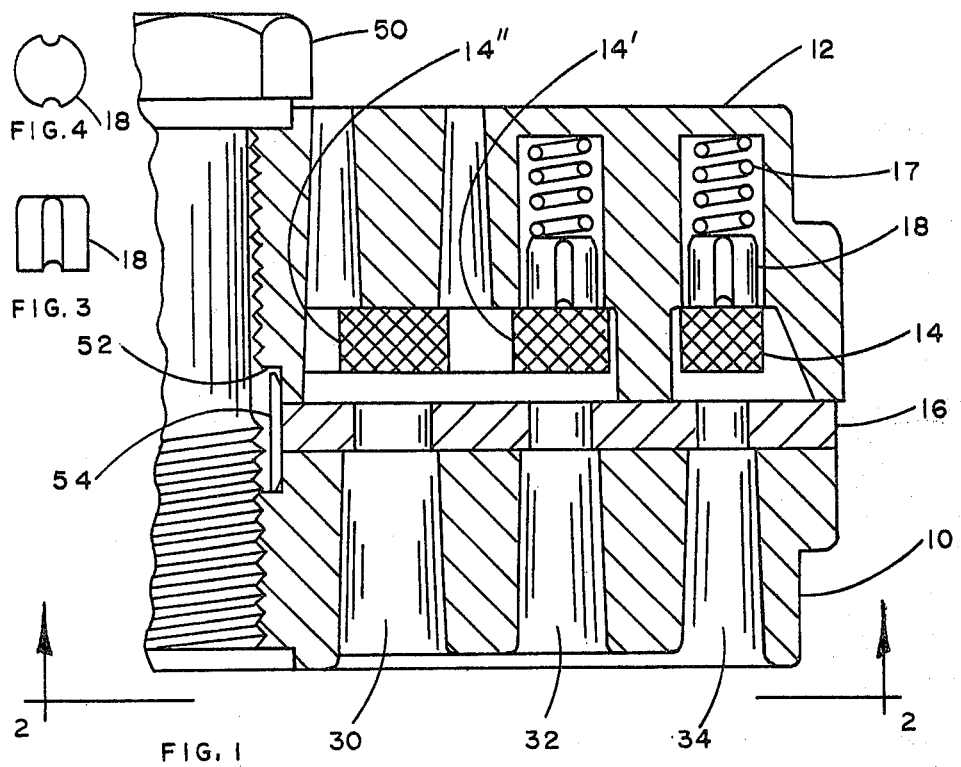
FIG. 1 is a partial cross-sectional elevation view, taken along line 1—1 of FIG. 2, of a three plate valve in accordance with a preferred embodiment of the present invention.
Figure 2:
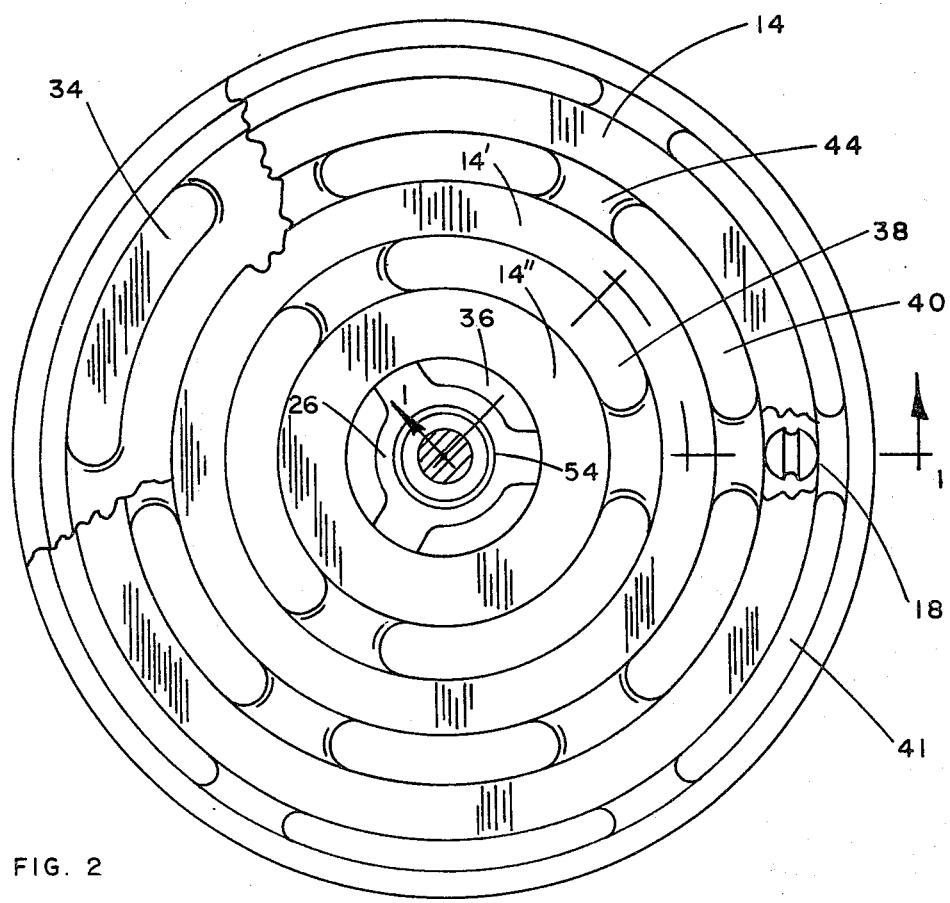
FIG. 2 is a bottom plan view, partly broken away and on a reduced scale, of the valve of FIG. 1.

The valve has been shown in FIG. 1 in the open position wherein the pressure applied to plates 14 exceeds the bias of compression springs 17 which normally hold the valve closed. The springs 17 are spaced in annular arrays around the valve and the force of the springs is delivered to plates via buttons 18. In accordance with a preferred embodiment of the invention, the ratio of the number of springs acting on any one plate to the mean diameter of that plate in inches is greater than 1.2. By observing this spring-to-plate diameter ratio it has been found that the loading of the plates is such that stresses are minimized while the possibility of the plates cocking to one side is virtually eliminated.

Returning to a discussion of the plates themselves, enhanced results have been achieved through the use of plates having a rectangular cross-section with a thickness of at least 0.2 inches. In accordance with one embodiment, highly desirable results were obtained employing a thickness to width ratio of greater than 0.5. Further, it has been found highly advantageous to fabricate the plates 14 from fiber reinforced plastic material with particularly good results being achieved employing glass-filled nylon. An annular glass-filled nylon plate having a thickness of at least 0.2 inches will, with varying gas temperature, experience radial growth or shrinkage but will show very little change in width. This is essential to successful valve operation over a wide range of temperatures.

In the interest of facilitating opening of the valve, by rapidly exhausting gas trapped behind the buttons 18, the buttons are provided with grooved side and bottom surfaces as may be seen from FIGS. 3 and 4. The use of such vented buttons will eliminate the possible need for drilling vent holes in the guard 12 which communicate with the recesses in which the springs 17 are positioned.

The seat member 10 is provided with arcuate passages, as indicated at 30, 32 and 34, which are arranged in concentric rings to thereby effectively define a plurality of annular inlets. The ends of these passages which face the guard member 12 will be in registration with similarly shaped passages in the seat insert 16. The guard 12 defines the valve chamber and arcuate discharge passages which are also arranged concentrically so as to effectively form annular discharges staggered in relation to the annular inlets. The discharge passages are indicated at 36, 38, 40 and 41. The guard 42 will also have, projecting downwardly into the valve chamber, a plurality of guide posts 44 for directing the axial movement of the plates 14. The guide posts 44 are positioned and sized so as to allow for plate growth due to thermal expansion and plate shrinkage due to drying out or stress relaxation.

The valve shown in the drawing is assembled by means of joining the seat 10 and guard 12 together through the use of a single bolt 50 located on the axis of the valve. In order to accommodate bolt 50, both the seat 10 and guard 12 are provided with an axial through-hole which, proceeding inwardly from the outwardly disposed sides of the valve, is threaded in both the seat and guard. This permits the bolt 50 to enter from either side so that, when the valve is installed in the cylinder head of a reciprocating compressor, the head of bolt 50 can always be forced away from the cylinder bore so that the piston will not hit the bolt. Further, this assembly arrangement permits the valve to be employed as either a suction or a discharge valve since the valve can be installed with either the guard or seat facing outwardly. An annular recess 52 is defined by cut-outs at the facing ends of the axial bolt receiving passage in seat 10 and guard 12. A short split tube 54 is positioned in the recess defined at the center of the seat and guard. The split tube 54 insures accurate alignment of the posts 44 on guard 12 with the seat insert 16 and the seat body 10 by aligning and fixing the exact centers of the guard 12, seat insert 16, and seat body 10.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A plate valve comprising:

valve seat means, said seat means having a flat seating surface and a first plurality of circumferentially arranged ports of arcuate shape spaced apart radially about an axis of the valve, said ports intersecting said seating surface and providing fluid communication between said seating surface and an oppositely disposed side of said seat means;

guard means, said guard means having a second plurality of circumferentially arranged ports of arcuate shape spaced apart radially about said valve axis, the ports of the second plurality being radially offset with respect to ports of said first plurality and extending between a pair of oppositely disposed sides of said guard means, said seat means and said guard means cooperating to define a valve chamber therebetween, the seating surface being disposed in said chamber;

means for securing said seat means to said guard means;

a plurality of concentric annular valve plates in said chamber, said valve plates being spaced apart radially about said valve axis and being aligned with the ports of said first plurality, said plates having a thickness which exceeds 0.2 inches and having a thickness to width ratio which exceeds 0.5; and means for resiliently biasing said plates towards said seating surface, said biasing means including a plurality of springs cooperating with each of said plates, the ratio of the number of springs associated with each plate to the mean diameter of that plate being greater than 1.2 per inch.

2. The valve of claim 1 wherein said plates are comprised of a fiber reinforced plastic material.

3. The valve of claim 1 wherein said securing means comprises:

a through-hole in said seat means, said seat means through-hole being located on the valve axis and being provided on at least a portion of its defining wall with a screw thread;

a through-hole in said guard means, said guard means through-hole being located on the valve axis and being provided on at least a portion of its defining wall with a screw thread, the screw thread on said guard means through-hole defining wall matching the screw thread on said seat means through-hole defining wall; and a bolt, said bolt having a threaded portion with a thread complimentary to the screw threads in the through-holes in said seat and guard means, said bolt having an enlarged head portion, the head portion of said bolt contacting an outwardly disposed surface on one of said seat and guard means and the threaded portion of said bolt engaging the screw thread on the through-hole defining wall of the other of said seat and guard means, said bolt being reversible.

4. The valve of claim 3 wherein said securing means further comprises:

a recessed portion at the facing ends of the through-holes in each of said seat and guard means, said recessed portions defining a pair of facing shoulders; and a split ring supported between said shoulders.

5. The valve of claim 4 wherein said guard means includes:

a plurality of blind holes extending inwardly from the surface which is disposed in said chamber, said blind holes being in registration with said plates, one of said springs being disposed in each of said blind holes; and a contact button at least disposed per movement in each of said blind holes, said buttons being of generally cylindrical shape and having a diameter slightly smaller than the diameter of the hole in which it is disposed, said buttons each having at least a first longitudinal groove in the side therof, said buttons transmitting the force of said springs to said plates.

6. The valve of claim 5 wherein said seat means comprises:

means defining a plurality of inlet ports, said inlet port defining means forming said oppositely disposed side of said seat means; and a seat insert, said seat insert being sandwiched between said inlet port defining means and said guard means, said seat insert having apertures which are in registration with said inlet ports, a first surface of said seat insert forming said seating surface.

7. The valve of claim 4 wherein said seat means comprises:

means defining a plurality of inlet ports, said inlet port defining means forming said oppositely disposed side of said seat means; and a seat insert, said seat insert being sandwiched between said inlet port defining means and said guard means, said seat insert having apertures which are in registration with said inlet ports, a first surface of said seat insert forming said seating surface.

8. The valve of claim 3 wherein said plates are comprised of glass filled nylon.

9. The valve of claim 1 wherein said guard means includes:

a plurality of blind holes communicating with said chamber, said blind holes being in registration with said plates, one of said springs being disposed in each of said blind holes; and a contact button at least partly disposed in each of said blind holes, said buttons transmitting the force of said springs to said plates, said buttons being of generally cylindrical shape and each having at least a first longitudinal groove in the side thereof.

10. The valve of claim 1 wherein said seat means comprises:

means defining a plurality of inlet ports, said inlet port defining means forming said oppositely disposed side of said seat means; and a seat insert, said seat insert being sandwiched between said inlet port defining means and said guard means, said heat insert having apertures which are in registration with said inlet ports, a first surface of said seat insert forming said seating surface.

* * * * *